Sept. 16, 1969         R. P. DE PUY         3,466,743
SPIRAL COIL COMPRISING A TUBULAR BLANK WITH
PARALLEL, RECTILINEAR CUTS THEREIN
Filed July 2, 1965                         3 Sheets-Sheet 1

INVENTOR:
ROBERT P. DePUY,
BY Albert S. Richardson Jr.
ATTORNEY

INVENTOR:
ROBERT P. DEPUY,
BY Albert S. Richardson Jr.
ATTORNEY

INVENTOR:
ROBERT P. DePUY,
BY Albert S. Richardson Jr
ATTORNEY

United States Patent Office 3,466,743
Patented Sept. 16, 1969

3,466,743
SPIRAL COIL COMPRISING A TUBULAR BLANK
WITH PARALLEL, RECTILINEAR CUTS THEREIN
Robert P. De Puy, Cherry Hill, N.J., assignor to General
Electric Company, a corporation of New York
Filed July 2, 1965, Ser. No. 469,072
Int. Cl. H01f 7/06
U.S. Cl. 29—602                                    2 Claims

ABSTRACT OF THE DISCLOSURE

A relatively inexpensive quasi-helical coil of high current, low voltage rating is formed by boring two sets of diametrically opposed, longitudinally aligned holes through the walls of a tubular aluminum blank and then making a series of parallel, rectilinear cuts in opposite sides of the blank, each cut being inclined with respect to the centerlines of the holes of the two sets with which it registers.

---

This invention relates to coils and, more particularly, it relates to a coil that can conduct relatively high electric current and to a process of manufacturing a coil of this nature.

While coils manufactured in accordance with this invention may be used in various settings, such as solenoids or air-core inductors, they are particularly useful as applied to low-voltage, high current reactors such as those found in high capacity battery charger systems. Coils used in this and equivalent commercial applications have heretofore had relatively low thermal efficiency and have been difficult and expensive to manufacture.

In order to avoid overheating in coils designed to carry high currents, the cross section of the coil conductor is made as large as is economically and physically practical. In addition, design considerations for a given application sometimes dictate that special heat dissipating means be attached to a coil by welding, brazing, or other conventional bonding process to effect a further increase in the current carrying capacity of the coil. These approaches increase production costs because of the additional conductor material required and the separate bonding operation which must be performed.

A rectangular configuration, rather than annular, is preferred for helical coils designed for use with laminated cores of magnetizable material. The prior art method of forming such a coil by bending the conductor stock is not entirely satisfactory because of the resulting distortion of the conductor cross section in the vicinity of the corners of the coil. This necessitates the provision of extra space for the conductor and undesirably increases the size of the core. Furthermore, bending or winding a high current conductor is cumbersome and has definite limitations as to the maximum size of conductor that can be economically handled.

It has heretofore been proposed to manufacture large coils by machining them from a cast, molded, extruded, or otherwise formed tubular blank, but this known method contemplates time consuming and somewhat difficult spiral machining and severing with consequent high production costs. The prior art approach is not at all practical for making helical coils of rectangular configuration, or when intimate heat radiating means are to be used.

The present invention is directed toward minimizing the difficulties of thermal inefficiency and high manufacturing costs which have been prevalent in the prior art coils of the class described. It is therefore one object of this invention to provide an improved high current, low voltage coil.

A further object of this invention is to provide a generally helical coil of rectangular configuration that permits the use of a lower conductivity (and hence less expensive) conductor material without increasing size or power loss.

A more specific object of this invention is to provide a high current coil incorporating integral, homogeneous heat radiating means.

It is yet another object of this invention to provide a novel and economical process of making coils.

A further specific object of this invention is to provide an improved method of manufacturing high current, low voltage coils, with or without integral heat radiating means, from cast, molded, extruded, or otherwise formed tubular blanks.

Briefly stated, in accordance with one aspect of the invention, a coil having quasi-helical turns is formed by making a series of parallel, rectilinear cuts in opposite sides of a tubular blank. A spiral effect is achieved by angling at least one of the two series of rectilinear cuts with respect to a right cross-section of the blank so that one of its cuts will intercept at one end an opposing second cut and will also meet, at its other end, a third cut which is parallel and adjacent to the second cut. The rectilinear cutting operations are accompanied by a manufacturing operation whereby two oppositely disposed series of longitudinally arrayed apertures are bored or otherwise provided in the blank walls. These apertures function as guides and terminations for the rectilinear cuts. Conveniently, the distance between adjacent apertures is equal in each series and this distance is the same for both series.

Additional objects of this invention, its advantages, scope, and the manner in which it may be practiced will become more readily apparent to persons conversant with the art from the following detailed description of exemplary embodiments and methods taken in conjunction with the annexed drawings of which:

Figure 1A:
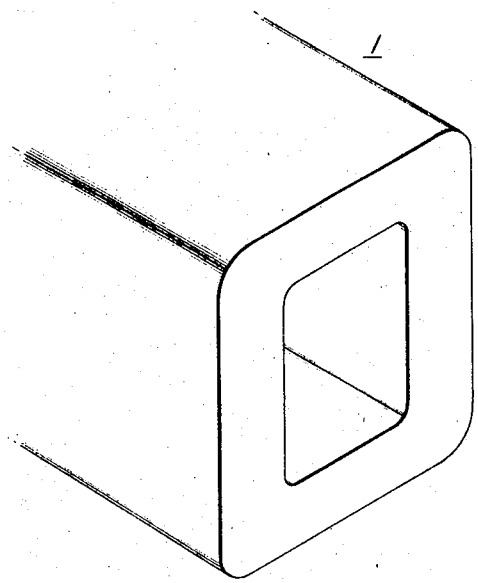
FIGURE 1A is a fragmentary perspective view of a simple tubular blank from which a coil of relatively high current carrying capacity is to be fabricated.

For purposes of illustration, the invention will be explained and illustrated as it would be practiced with a simple thick walled tubular blank 1 of electroconductive material (e.g. aluminum) such as that shown in FIGURE 1A. It is to be understood, of course, that while a tubular blank of generally rectangular configuration is preferred, the invention is in no way limited to a blank of this exact shape and configuration.

Figure 1B:
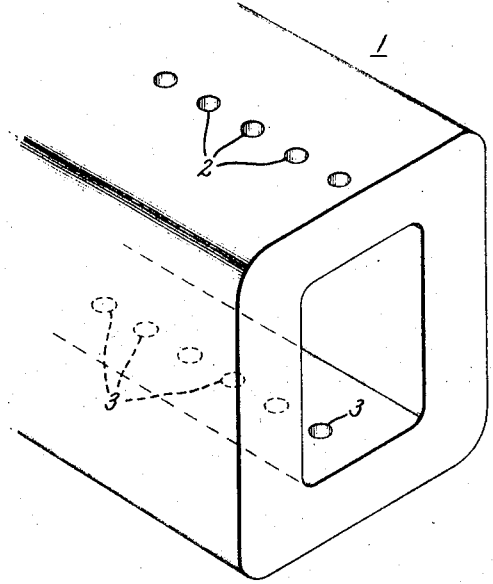
FIGURE 1B is a similar view of the tubular blank of FIGURE 1A after a boring step has been performed.

After the tubular blank 1 has been cut to length, two opposed series of longitudinally arrayed apertures 2 and 3 are bored through the walls of the blank as shown in FIGURE 1B. Alternatively, if a cast or molded blank were used, the apertures may be directly cast or molded in it to obviate the necessity for performing a boring operation. With either method, the apertures are carefully placed and properly sized for reasons that will become apparent below.

Figure 1C:
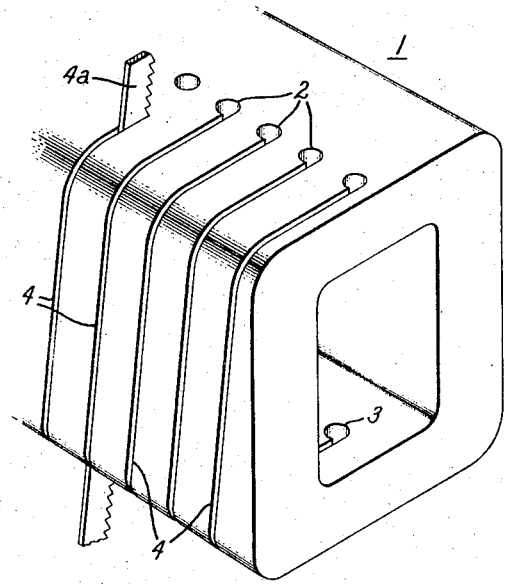
FIGURE 1C illustrates rectilinear cuts being made in the tubular blank of FIGURE 1B.
Figure 1D:
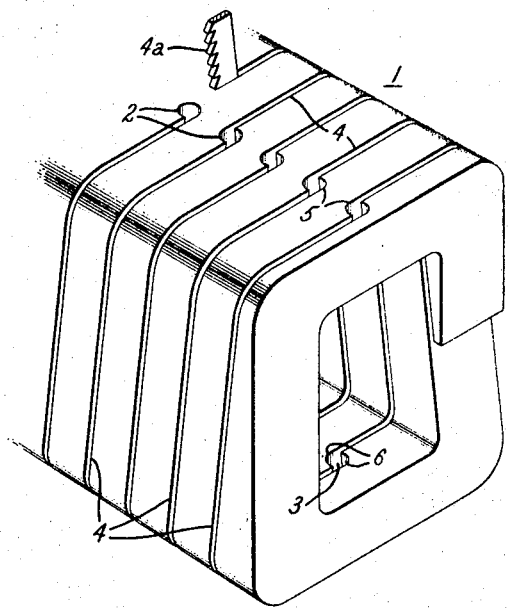
FIGURE 1D shows the disposition of a second series of rectilinear cuts made in the tubular blank of FIGURE 1C.

As shown in FIGURES 1C and 1D, parallel rectilinear cuts 4 generally transverse to the longitudinal axis of the blank are made first on one side of the blank and then on the opposite side to connect the two opposing series of apertures. These two sets of cuts are oppositely inclined with respect to the aperture centerlines, and therefore each aperture 2 is intercepted by two different cuts that define intersecting planes. In performing the cutting operation, it may be convenient to maintain the cutting element, such as the illustrated band saw blade 4a, in a fixed position and move the blank longitudinally after each cut is made. When one side is completed, the blank may be inverted to permit making the second series of cuts. Subsequently, the end finishing may be accomplished by any suitable shop method.

As has been noted above, the invention is especially useful as applied to coils which may be required to carry exceptionally high current. It is readily apparent that a tubular blank from which a high current capacity coil is to be produced must have relatively thick walls to provide a large conductor cross-section. It is also apparent that to create a continuous structure with quasi-helical turns, at least one and preferably both series of rectilinear cuts must be inclined or angled to a right cross-sectional plane of the blank. Because of these factors, an important aspect of the invention is the relationship between the diameter and placement of the apertures 2 and 3, the thickness of the tubular blank walls, and the angle of the rectilinear cuts which are to be made.

Figure 2:
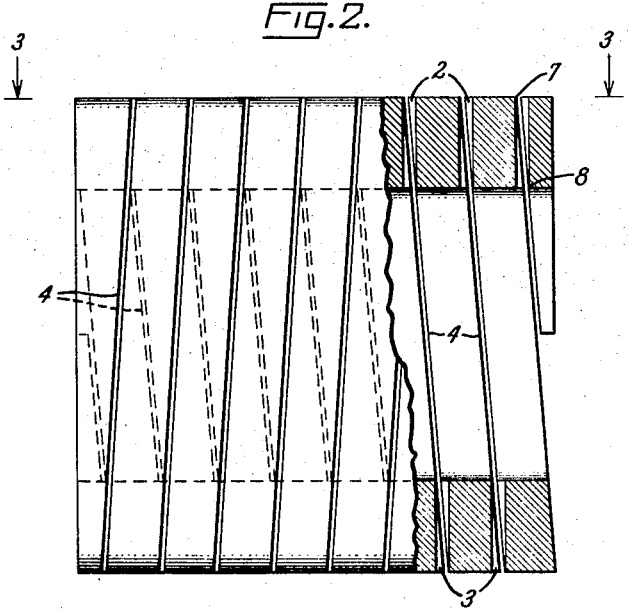
FIGURE 2 is a side elevation, partly in section, of the completed coil of FIGURE 1D.

The diameter of the apertures 2 and 3 are large enough to permit complete severance at the terminations of the angled cuts but should be no larger than necessary to avoid decreasing the amount of conductor material remaining between adjacent aperture positions which would create necks of decreased electrical capacity. The optimum size of the apertures used with the example blank is illustrated in FIGURES 1D and 2. It can be seen in FIGURE 1D that the cuts intercept the apertures approximately tangentially at the example points 5, 6. It is important to note, however, that an individual cut intercepts a given aperture at an angle, whereby the tangential terminations at the inner and outer ends of the aperture fall on opposite sides. This is illustrated in FIGURE 2 at the points 7 and 8. The diameter of the apertures is just sufficient to accommodate the angle of the cuts used in the illustrated embodiment. If the angle were greater and/or the walls of the tubular blank thicker, it would be necessary to use larger diameter apertures. If the angles of the cuts were narrower, and/or the walls of the tubular blank thinner, smaller apertures would be adequate.

Figure 3:
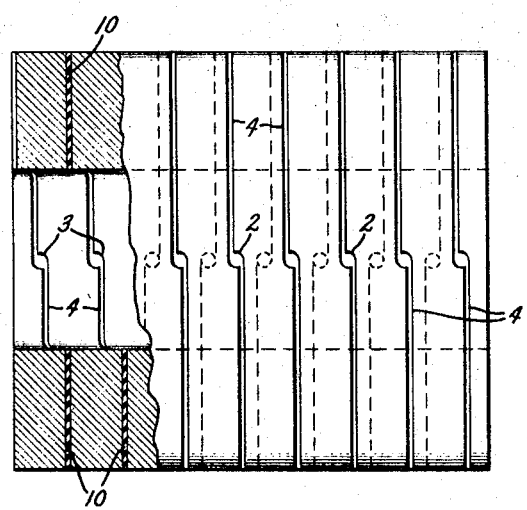
FIGURE 3 is a view of the coil taken along lines 3—3 of FIGURE 2.

In the tubular blank illustrated, the aperture centerlines of one series of apertures fall approximately midway between aperture centerlines of the opposite series of apertures as best shown in FIGURE 3. This is an optimum arrangement with the above-mentioned production method in which the blank is simply inverted after making the first series of rectilinear cuts and before making the second series of cuts because the angle of the cutting element is the same for each series.

Figure 4:
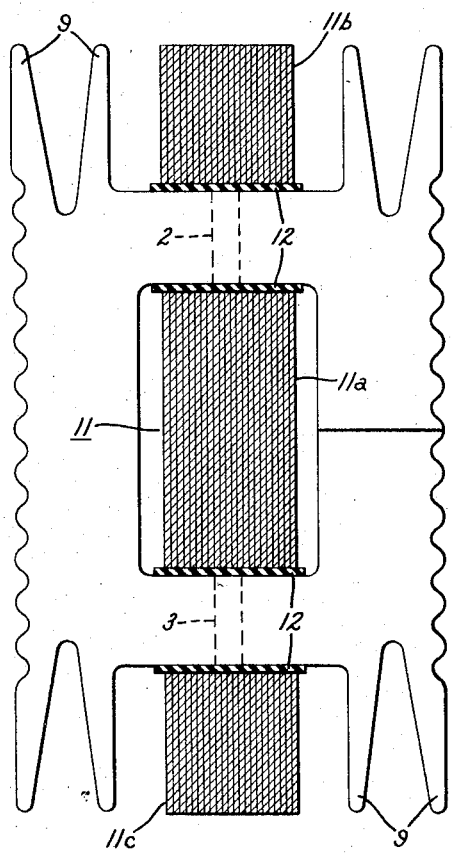
FIGURES 4 and 5 are end views of typical coils which may be used in practice.
Figure 5:
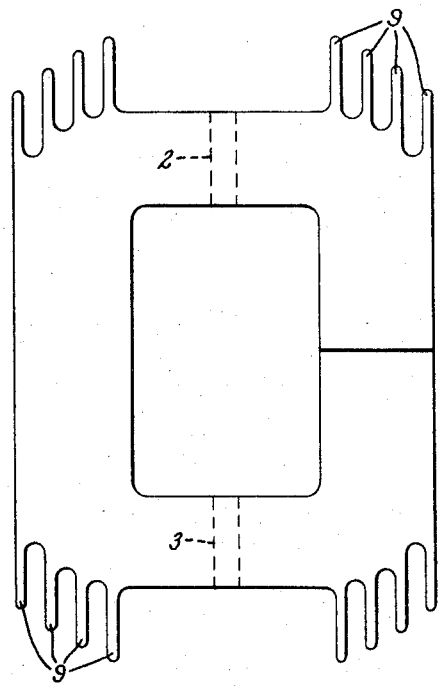

FIGURES 4 and 5 are end views of coils embodying the invention for applications which require high current capacity. The tubular blanks are formed with integral heat radiating means 9 that protrude from opposite sides of the blank along its full length. Thus the coils produced from such blanks are homogeneous, and problems associated with the use of separately attached heat radiating means on each turn of the coil are eliminated.

When a coil has been completed by the preferred method, it may be desirable to rigidly maintain the separation between adjacent turns and/or insure that the turns do not become shorted together. To maintain the desired separation, insulating spacers 10 may be placed in the apertures or in the cuts between turns as may be required. The size of the spacer will determine the minimum separation between adjacent turns and assure that the turns are uniformly spaced and do not become shorted when the coil is in operation. Preferably spacers are located only in the vicinity of the four corners of the coil.

For those applications where the electrical and mechanical requirements are somewhat less stringent, boring the apertures larger than the optimum size manifestly permits a reduction in the precision required in the cutting operation.

In FIGURE 4 the coil is shown mounted on a laminated core 11 of magnetizable material to form a high current reactor or choke. The core 11 comprises three legs 11a, 11b and 11c, shown in cross section, which are joined together at opposite ends by similar transverse laminations. The coil extends snugly through the rectangular interleg windows and around the central leg 11a of the core, being electrically isolated therefrom by suitable insulation 12. If desired an air gap can be provided in the central leg 11a.

While my invention has been described by way of illustration in terms of particular embodiments, it is not limited to the embodiments or methods discussed above. To the contrary, the invention is capable of variations in the placement of the apertures and the relative angles of the parallel rectilinear cuts and other modifications which will be recognized by those skilled in the art. These modifications are within the scope of the invention, and it should not be limited in any sense except as defined by the concluding claims.

What I claim as new and desire to secure by United States Letters Patent is:

1. The method of manufacturing a coil from a tubular blank having diametrically opposite walls comprising the steps of:
    (a) boring a first series of equally spaced, longitudinally aligned circular holes through a first one of said walls from the outer surface to the inner surface thereof;
    (b) boring a second series of equally-spaced, longitudinally-aligned circular holes through the opposite wall from its outer surface to its inner surface, the spacing between hole centerlines in both said series being the same;
    (c) making a first series of parallel rectilinear cuts on one side of the tubular blank connecting holes in said first series of holes to holes in said second series of holes, each of said cuts being angled with respect to the hole centerlines to intercept a hole in said first series approximately tangentially at the outer and inner surfaces of said first wall and to intercept a hole in said second series approximately tangentially at the outer and inner surfaces of said opposite wall; and
    (d) making a second series of parallel rectilinear cuts opposite said first series of cuts connecting holes in said first series of holes to holes in said second series of cuts, said cuts of said second series of cuts being angled with respect to the hole centerlines in a direction opposite that of the first series of cuts and each intercepting a hole in said first series approximately tangentially at the outer and inner surfaces of said first wall and intercepting a hole in said second series approximately tangentially at the outer and inner surfaces of said opposite wall;
    (e) said second series of cuts being disposed relative to said first series of cuts such that separate cuts which meet in a single hole of one of said first or second series of holes define intersecting planes and terminate in adjacent holes in the opposing series of holes.

2. The method of manufacturing a coil from a tubular blank comprising the steps of:
    (a) forming a first series of equally spaced, longitudinally aligned circular apertures in a wall of the tubular blank;
    (b) forming a second series of equally spaced, longitudinally aligned circular apertures in the wall of the tubular blank opposite said first series of apertures, centerlines of the apertures in said first series of apertures falling approximately midway between centerlines of apertures in said second series of apertures;

(c) making a first series of parallel rectilinear cuts on one side of the tubular blank connecting apertures in said first series of apertures to apertures in said second series of apertures, said cuts being angled with respect to the aperture centerlines such that said cuts intercept said apertures approximately tangentially at the outer surface of the tubular blank; and (d) making a second series of parallel rectilinear cuts opposite said first series of cuts connecting apertures in said first series of apertures to apertures in said second series of apertures, the cuts of said second series of cuts being angled with respect to the aperture centerlines in a direction opposite that of the first series of cuts such that cuts of said second series of cuts intercept said apertures approximately tangentially at the outer surface of the tubular blank and substantially opposite the terminations of cuts of said first series of cuts in said apertures;

(e) said second series of cuts being disposed relative to said first series of cuts such that individual cuts which meet in a single aperture of one of said first or second series of apertures terminate in adjacent apertures in the opposing series of apertures.

References Cited

UNITED STATES PATENTS

| | | | |
|---|---|---|---|
| 2,592,802 | 4/1952 | Harrold | 29—602 X |
| 2,599,182 | 6/1952 | Kerns | 29—605 X |
| 3,126,616 | 3/1964 | Pietsch | 29—573 |
| 3,237,281 | 3/1966 | Antonson | 29—573 |
| 923,202 | 6/1909 | Pevear. | |
| 2,435,242 | 2/1948 | Somes. | |

JOHN F. CAMPBELL, Primary Examiner

C. E. HALL, Assistant Examiner

U.S. Cl. X.R.

83—33, 51